United States Patent
Risko et al.

(10) Patent No.: US 9,841,081 B2
(45) Date of Patent: Dec. 12, 2017

(54) DUAL INPUT TRANSMISSION

(71) Applicant: GM Global Technology Operations LLC, Detroit, MI (US)

(72) Inventors: Rebecca Risko, Ferndale, MI (US); Jack M. Gayney, Grosse Ile, MI (US); Addison T. Solak, Ypsilanti, MI (US)

(73) Assignee: GM GLOBAL TECHNOLOGY OPERATIONS, LLC, Detroit, MI (US)

(*) Notice: Subject to any disclaimer, the term of this patent is extended or adjusted under 35 U.S.C. 154(b) by 232 days.

(21) Appl. No.: 14/847,483

(22) Filed: Sep. 8, 2015

(65) Prior Publication Data
US 2017/0067541 A1 Mar. 9, 2017

(51) Int. Cl.
| | | |
|---|---|---|
| F16H 3/08 | (2006.01) | |
| F16H 3/091 | (2006.01) | |
| F16H 3/00 | (2006.01) | |
| F16H 57/021 | (2012.01) | |

(52) U.S. Cl.
CPC ............ *F16H 3/091* (2013.01); *F16H 3/006* (2013.01); *F16H 57/021* (2013.01); *F16H 2057/0216* (2013.01)

(58) Field of Classification Search
CPC .................. F16H 37/021; F16H 2003/0931
USPC .................... 74/330, 331, 333, 340
See application file for complete search history.

(56) References Cited

U.S. PATENT DOCUMENTS

| | | | | |
|---|---|---|---|---|
| 6,638,197 B2 * | 10/2003 | Ogawa | ............... | B60W 10/02 477/174 |
| 8,495,925 B2 * | 7/2013 | Pesola | ............... | F16H 3/006 74/330 |
| 8,573,085 B2 * | 11/2013 | Mizuno | ............... | F16H 3/006 74/330 |
| 8,590,410 B2 * | 11/2013 | Yoshimi | ............... | F16H 3/006 74/330 |
| 2006/0266144 A1 * | 11/2006 | Schafer | ............... | F16H 3/006 74/340 |

* cited by examiner

*Primary Examiner* — Ha D Ho

(57) ABSTRACT

A transmission includes a transmission housing, six coplanar gear sets, a first and second input shafts, an output member, a first and second countershaft, and six synchronizer assemblies. The six synchronizer assemblies are selectively engaged to establish one of at least eight forward speed ratios and one reverse speed ratio between the transmission input shaft member and the output member.

20 Claims, 2 Drawing Sheets

DUAL INPUT TRANSMISSION

TECHNICAL FIELD

The present disclosure relates to transmissions and more particularly to a compact, dual input or dual clutch transmission having three axes to establish at least eight gear speeds and a reverse gear speed.

BACKGROUND

The statements in this section merely provide background information related to the present disclosure and may or may not constitute prior art.

A typical multiple speed transmission having countershafts and coplanar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs and high rotating inertias, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging and improved efficiency while providing desirable gear ratios and torque ranges.

SUMMARY

The present invention provides a transmission having a transmission housing, a plurality of coplanar gear sets, a first input shaft, a transmission clutch assembly, a first countershaft, a first transfer gear, an output member, and a plurality of synchronizers. The plurality of coplanar gear sets each includes at least a first gear in mesh with a second gear. The plurality of coplanar gear sets including at least a first coplanar gear set. The first input shaft is rotatably supported in the transmission housing. The first gear of several of the plurality of coplanar gear sets is rotatably supported by the first input shaft. The transmission clutch assembly includes at least one clutch for selectively connecting the first input shaft to an engine output member. The first countershaft is rotatably supported by the transmission housing and is spaced apart from and is parallel with the first input shaft. The second gear of several of the plurality of coplanar gear sets is selectively connectable for common rotation with the first countershaft. The first transfer gear is intermeshed with the output member. The first transfer gear is rotatably supported by and selectively connectable with the first countershaft. The plurality of synchronizer assemblies each selectively coupling at least one of the second gears of the plurality of coplanar gear sets with the first countershaft and for selectively coupling a first gear of a first of the plurality of coplanar gear sets to the first input shaft. The selective engagement of at least one of the plurality of synchronizer assemblies establishes one of a plurality of forward speed ratios and one reverse speed ratio between the first input shaft member and the output member. The first gear of the first coplanar gear set is selectively connectable to the first input shaft. The second gear of the first coplanar gear set is fixedly connected for common rotation with the first transfer gear.

In another example of the present invention, the first gear of the first coplanar gear set is selectively coupled for common rotation with the first input shaft and the first transfer gear is disengaged from the first countershaft to achieve an overdrive gear ratio between the first input shaft and the output member.

In yet another example of the present invention, the transmission housing includes a first end wall and a second end wall opposite the first end wall. The first end wall is disposed proximate the transmission clutch assembly. The first coplanar gear set is disposed adjacent the first end wall.

In yet another example of the present invention, the plurality of synchronizer assemblies includes a first synchronizer assembly that selectively that connects the first gear of the first coplanar gear set to the first input shaft.

In yet another example of the present invention, the plurality of synchronizer assemblies includes a second synchronizer assembly that selectively connects the first transfer gear and the second gear of the first coplanar gear set to the first countershaft.

In yet another example of the present invention, the transmission further includes a first and second roller bearings and a first and second thrust bearings. The first countershaft is rotatably supported by the first end wall through a first roller bearing and by the second end wall through a second roller bearing, the first thrust bearing is disposed on the first countershaft between the second gear of the first coplanar gear set and the second synchronizer assembly, and the second thrust bearing is disposed on the first countershaft between the first transfer gear and the first roller bearing.

In yet another example of the present invention, the plurality of synchronizer assemblies includes a third synchronizer assembly. The plurality of coplanar gear sets includes a third coplanar gear set. The third synchronizer assembly selectively connects a second gear of the third coplanar gear set to the first countershaft.

In yet another example of the present invention, the plurality of synchronizer assemblies includes a fourth synchronizer assembly. The plurality of coplanar gear sets includes a fourth and a fifth coplanar gear set. The fourth synchronizer assembly selectively connects a second gear of one of the fourth and fifth coplanar gear sets to the first countershaft.

In yet another example of the present invention, the transmission further includes a second input shaft and a second countershaft. The second input shaft is coaxial with and at least partially covered by the first input shaft. The second input shaft is selectively connectable to the output of the engine through a second clutch of the transmission clutch assembly. The second countershaft is disposed parallel to each of the input shafts and the first countershaft.

In yet another example of the present invention, the transmission further includes a second transfer member fixed for common rotation with the second countershaft and intermeshed with the output member.

In yet another example of the present invention, the plurality synchronizer assemblies includes a fifth synchronizer assembly and the third coplanar gear set includes a third gear. The fifth synchronizer assembly selectively connects one of the second gear of the second coplanar gear set and the third gear of the third coplanar gear set to the second countershaft.

In yet another example of the present invention, the plurality of synchronizer assemblies includes a sixth synchronizer assembly. The fourth coplanar gear set includes a third gear. The plurality of coplanar gear sets includes a sixth coplanar gear set. The sixth synchronizer assembly selectively connects one of the second gear of the sixth coplanar gear set and the third gear of the fourth coplanar gear set to the second countershaft.

In yet another example of the present invention, the first coplanar gear set provides an eighth forward speed ratio, the second coplanar gear set provides a second forward speed ratio, the third coplanar gear set provides a sixth and a fourth forward speed ratios, the fourth coplanar gear set provides a fourth and a seventh forward speed ratios, the fifth coplanar gear set provides a third forward speed ratio, the sixth coplanar gear set provides a first forward speed ratio, and the plurality of coplanar gear sets includes a seventh coplanar gear set that provides a reverse speed ratio.

The above features and advantages and other features and advantages of the present invention are readily apparent from the following detailed description of the best modes for carrying out the invention when taken in connection with the accompanying drawings.

DESCRIPTION

Figure 1:
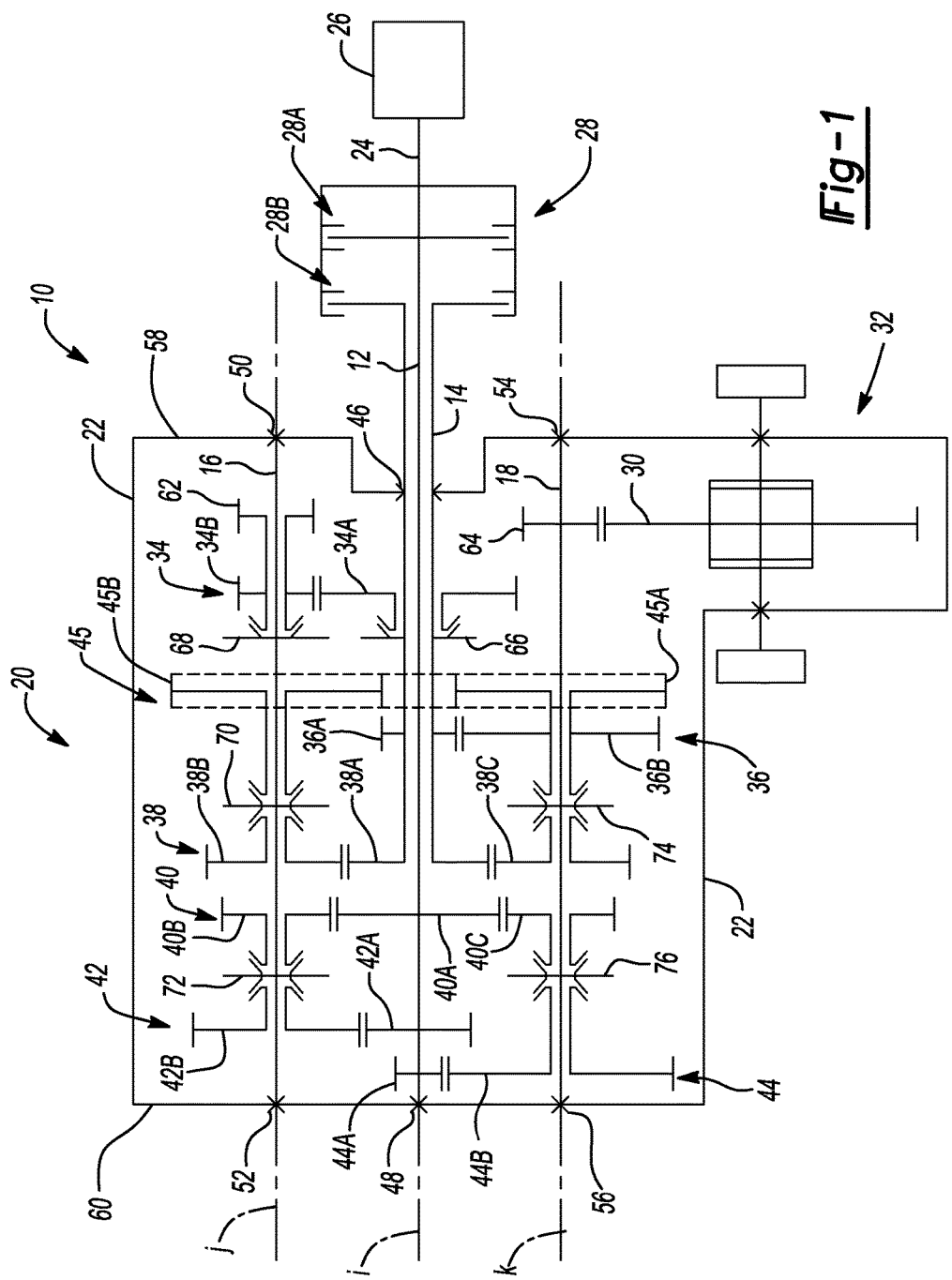
FIG. 1 is a schematic view of an example of an eight speed transmission, in accordance with the present invention.

Referring to FIG. 1, a multiple speed manual transmission generally indicated by reference number 10 is illustrated and will now be described. The transmission 10 includes a first and a second input shaft 12, 14, a first and a second countershaft 16, 18, an output member 30, and a gearing arrangement 20 enclosed by a transmission housing 22. The first and second input shafts 12, 14 are coaxial and each selectively connectable to an output member 24 of an engine 26 through a dual clutch assembly 28. The dual clutch assembly 28 includes a first clutch 28A and second clutch 28B. The first clutch 28A selectively connects the output member 24 of the engine 26 to the first input shaft 12. The second clutch 28B of the dual clutch assembly 28 selectively connects the output member 24 of the engine to the second input shaft 14. The first and second input shafts 12, 14 may be further isolated from the output member 24 of the engine 26 through a flywheel or damper (not shown) to improve vibration transmission from the engine 26 to the transmission 10. The output member 30 transfers torque to drive wheels through a differential assembly 32.

The gearing arrangement 20 includes various shafts or members, co-planar intermeshing gear sets, and selectively engageable synchronizers, as will be described herein. For example, the gearing arrangement 20 includes first, second, third, fourth, fifth, sixth, and seventh coplanar gear sets 34, 36, 38, 40, 42, 44, 45 each having at least a first gear 34A, 36A, 38A, 40A, 42A, 44A, 45A and a second gear 34B, 36B, 38B, 40B, 42B, 44B, 45B. The third and fourth coplanar gear sets 38, 40 further include a third gear 38C, 40C. The first gear 40A of the fourth coplanar gear set 40, the first gear 42A of the fifth coplanar gear set 42, and the first gear 44A of the sixth coplanar gear set 44 are fixed for common rotation with the first input shaft 12. The first gear 36A of the second coplanar gear set 36 and the first gear 38A of the third coplanar gear set 38 are fixed for common rotation with the second input shaft 14. The first gear 34A of the first coplanar gear set 34 is selectively connectable to the second input shaft 14.

The first and second countershafts 24, 26 are spaced apart from and parallel with the first transmission input shaft 12. The second and third gears of the coplanar gear sets are selectively connectable to one of the countershafts. For example, the second gears 34B, 38B, 40B, 42B, of the first, third, fourth, and fifth coplanar gear sets 34, 38, 40, 42 are each selectively connectable to the first countershaft 16. The second gears 36B, 44B, of the second and sixth coplanar gear sets 36, 44 are each selectively connectable to the second countershaft 18. The third gear 38C, 40C of the third and fourth coplanar gear sets 38, 40 are each selectively connectable to the second countershaft 18. The first gear 45A of the seventh coplanar gear set 45 is rotatably supported by the second countershaft 18 and fixedly connected to the second gear 36B of the second coplanar gear set 36. The second gear 45B of the seventh coplanar gear set 45 is selectively connectable to the first countershaft 16. The transmission input shafts 12, 14 define a first axis of rotation i, the first countershaft 16 defines a second axis of rotation j and the second countershaft 18 defines a third axis of rotation k.

The transmission input shafts 12, 14 and countershafts 16, 18 are rotatably supported in the housing 22 through a plurality of bearings. For example, the transmission input shafts 12, 14 are rotatably supported by the housing 22 through bearings 46, 48. The first countershaft 16 is rotatably supported by the housing 22 through bearings 50, 52. The second countershaft 18 is rotatably supported by the housing 22 through bearings 54, 56.

The first coplanar gear set is disposed between a first end wall 58 of the transmission housing 22 and the second coplanar gear set 36. The first gear 34A of the first coplanar gear set 34 is intermeshed with the second gear 34B of the first coplanar gear set.

The second coplanar gear set 36 is disposed between the first coplanar gear set 34 and the third coplanar gear set 38. The first gear 36A of the second coplanar gear set 36 is intermeshed with the second gear 36B of the second coplanar gear set 36.

The third coplanar gear set 38 is disposed between the second coplanar gear set 36 and the fourth coplanar gear set 40. The first gear 38A of the third coplanar gear set 38 is intermeshed with each of the second gear 38B and the third gear 38C of the third coplanar gear set 38.

The fourth coplanar gear set 40 is disposed between the third coplanar gear set 38 and the fifth coplanar gear set 42. The first gear 40A of the fourth coplanar gear set 40 is intermeshed with each of the second gear 40B and the third gear 40C of the fourth coplanar gear set 40.

The fifth coplanar gear set 42 is disposed between the fourth coplanar gear set 40 and the sixth coplanar gear set 44. The first gear 42A of the fifth coplanar gear set 42 is intermeshed with the second gear 42B of the fifth coplanar gear set 42.

The sixth coplanar gear set 44 is disposed between the fifth coplanar gear set 42 and a second end wall 60 of the transmission housing 22. The first gear 44A of the sixth coplanar gear set 44 is intermeshed with the second gear 44B of the sixth coplanar gear set 44.

The seventh coplanar gear set 45 is disposed between the first and second coplanar gear sets 34, 36. The first gear 45A of the seventh coplanar gear set 45 is intermeshed with the second gear 45B of the seventh coplanar gear set 45.

The gearing arrangement 20 also includes a first and a second countershaft transfer gears 62, 64. The first countershaft transfer gear 62 is rotatably fixed and connected for common rotation with first gear 34B of the first coplanar gear set 34. The second countershaft transfer gear 64 is rotatably fixed and connected for common rotation with the second countershaft 18. Each of the transfer gears 62, 64 are disposed within the transmission housing 22. The first countershaft transfer gear 62 and second countershaft transfer gear 64 are configured to mesh with output member 30. However, the first countershaft transfer gear 62 and the second countershaft transfer gear 64 do not mesh with each other. The first countershaft transfer gear 62 is disposed between the second gear 34B of the first coplanar gear set 34 and the first end wall of the transmission housing 22. The second countershaft transfer gear 64 is disposed between the first gear 36B of the second coplanar gear set 36 and the first end wall of the transmission housing 22. The output member 14 is coplanar with first and second countershaft transfer gears 62, 64.

The gearing arrangement 20 of the transmission 10 further includes a first, second, third, fourth, fifth, and sixth selectively actuatable synchronizer assemblies 66, 68, 70, 72, 74, 76. The first and second synchronizers 66, 68 are a single sided synchronizer that generally includes a shift fork (not shown) that is bi-directionally translated by an actuator (not shown) into either an engaged position or a neutral or disengaged position. In the present example, the first synchronizer 66 is selectively actuatable to connect the first gear 34A of the first coplanar gear set 34 to the second input shaft 14 for common rotation with the second input shaft 14. The second synchronizer 68 is selectively actuatable to connect the second gear 34B of the first coplanar gear set 34 to the first countershaft 16 for common rotation with the first countershaft 16. The third, fourth, fifth, and sixth synchronizers 70, 72, 74, 76 are double sided synchronizers each of which generally include a shift fork (not shown) that is bi-directionally translated by an actuator (not shown) into at least two engaged positions and a neutral or disengaged position. In the present example, the third synchronizer 70 is selectively actuatable to connect one of a reverse gear 78 and the second gear 38B of the third coplanar gear set 38 to the first countershaft 16 for common rotation with the first countershaft 16. The fourth synchronizer 72 is selectively actuatable to connect one of the second gear 40B of the fourth coplanar gear set 40 and the second gear 42B of the fifth coplanar gear set 42 to the first countershaft 16 for common rotation with the first countershaft 16. The fifth synchronizer 74 is selectively actuatable to connect one of the second gear 36B of the second coplanar gear set 36 and the third gear 38C of the third coplanar gear set 38 to the second countershaft 18 for common rotation with the second countershaft 18. The sixth synchronizer 76 is selectively actuatable to connect one of the third gear 40C of the fourth coplanar gear set 40 and the second gear 44B of the sixth coplanar gear set 44 to the second countershaft 18 for common rotation with the second countershaft 18.

The transmission 10 is capable of transmitting torque from the first and second input shafts 12, 14 to the output member 30 in at least eight forward torque ratios and at least one reverse torque ratio. Each of the forward torque ratios and the reverse torque ratio is attained by selective engagement of one or more of the synchronizer assemblies 66, 68, 70, 72, 74, 76. Those skilled in the art will readily understand that a different speed ratio is associated with each torque ratio.

It should be appreciated that each individual gear set 34, 36, 38, 40, 42, 44, 45 provides one or more forward and/or reverse gear ratios upon selective engagement of the synchronizer assemblies 66, 68, 70, 72, 74, 76. However, which synchronizer and which gear set are associated with a particular forward or reverse speed ratio may vary without departing from the scope of the present invention.

For example, to establish the reverse torque ratio, the second clutch 28B of the dual clutch assembly 28 is engaged to couple the output member 24 of the engine 26 to the second input shaft 14 and the second and third synchronizers 68, 70 are engaged to connect the second gear 45B of the seventh coplanar gear set 45 to the first countershaft 16 and the second gear 34B and the first transfer gear 62 to the first countershaft 16. More specifically, input torque from the output member 24 of the engine 26 is transferred through the second clutch 28B of the dual clutch assembly 28 through the first gear 36A of the second coplanar gear set 36, to the second gear 36B of the second coplanar gear set 36, through to the first gear 45A of the seventh coplanar gear set 45, to the second gear 45B of the seventh coplanar gear set 45, through the third synchronizer 70 to the first countershaft 16, through the second synchronizer 68 to the first transfer gear 62 to the transmission output member 30 to the differential assembly 32.

To establish a first forward torque ratio (i.e. a 1st gear), the first clutch 28A of the dual clutch assembly 28 is engaged to couple the output member 24 of the engine 26 to the first input shaft 12 and the sixth synchronizer 76 is engaged to connect the second gear 44B of the sixth coplanar gear set 44 to the second countershaft 18. More specifically, input torque from the output member 24 of the engine 26 is transferred through the first clutch 28A of the dual clutch assembly 28 to the first input shaft 12, through the first gear 44A of the sixth coplanar gear set 44 to the second gear 44A of the sixth coplanar gear set 44, through the sixth synchronizer 76 to the second countershaft 18, to the second transfer gear 64 to the transmission output member 30 and the differential assembly 32.

To establish a second forward torque ratio (i.e. a 2nd gear), the second clutch 28B of the dual clutch assembly 28 is engaged to couple the output member 24 of the engine 26 to the second input shaft 14 and the fifth synchronizer 74 is engaged to connect the second gear 36B of the second coplanar gear set 36 to the second countershaft 18. More specifically, input torque from the output member 24 of the engine 26 is transferred through the second clutch 28B of the dual clutch assembly 28 to the second input shaft 14, through the first gear 36A of the second coplanar gear set 36 to the second gear 36A of the second coplanar gear set 36, through the fifth synchronizer 74 to the second countershaft 18, to the second transfer gear 64 to the transmission output member 30 and the differential assembly 32.

To establish a third forward torque ratio (i.e. a 3rd gear), the first clutch 28A of the dual clutch assembly 28 is engaged to couple the output member 24 of the engine 26 to the first input shaft 12, the fourth synchronizer 72 is engaged to connect the second gear 42B of the fifth coplanar gear set 42 to the first countershaft 16, and the second synchronizer 68 is engaged to connect the first transfer gear 62 to the first countershaft 16. More specifically, input torque from the output member 24 of the engine 26 is transferred through the first clutch 28A of the dual clutch assembly 28 to the first input shaft 12, through the first gear 42A of the fifth coplanar gear set 42 to the second gear 42B of the fifth coplanar gear set 42, through the fourth synchronizer 72 to the first countershaft 16, through the second synchronizer 68 to the first transfer gear 62 to the transmission output member 30 and the differential assembly 32.

To establish a fourth forward torque ratio (i.e. a 4th gear), the second clutch 28B of the dual clutch assembly 28 is engaged to couple the output member 24 of the engine 26 to the second input shaft 14, the third synchronizer 70 is engaged to connect the second gear 38B of the third coplanar gear set 38 to the first countershaft 16, and the second synchronizer 68 is engaged to connect the first transfer gear 62 to the first countershaft 16. More specifically, input torque from the output member 24 of the engine 26 is transferred through the second clutch 28B of the dual clutch assembly 28 to the second input shaft 14, through the first gear 38A of the third coplanar gear set 38 to the second gear 38B of the third coplanar gear set 38, through the third synchronizer 70 to the first countershaft 16, through the second synchronizer 68 to the first transfer gear 62 to the transmission output member 30 and the differential assembly 32.

To establish a fifth forward torque ratio (i.e. a 5th gear), the first clutch 28A of the dual clutch assembly 28 is engaged to couple the output member 24 of the engine 26 to the first input shaft 12, the fourth synchronizer 72 is engaged to connect the second gear 40B of the fourth coplanar gear set 40 to the first countershaft 16, and the second synchronizer 68 is engaged to connect the first transfer gear 62 to the first countershaft 16. More specifically, input torque from the output member 24 of the engine 26 is transferred through the first clutch 28A of the dual clutch assembly 28 to the first input shaft 12, through the first gear 40A of the fourth coplanar gear set 40 to the second gear 40B of the fourth coplanar gear set 40, through the fourth synchronizer 72 to the first countershaft 16, through the second synchronizer 68 to the first transfer gear 62 to the transmission output member 30 and the differential assembly 32.

To establish a sixth forward torque ratio (i.e. a 6th gear), the second clutch 28B of the dual clutch assembly 28 is engaged to couple the output member 24 of the engine 26 to the second input shaft 14 and the fifth synchronizer 74 is engaged to connect the third gear 38C of the third coplanar gear set 38 to the second countershaft 18. More specifically, input torque from the output member 24 of the engine 26 is transferred through the second clutch 28B of the dual clutch assembly 28 to the second input shaft 14, through the first gear 38A of the third coplanar gear set 38 to the third gear 38C of the third coplanar gear set 38, through the fifth synchronizer 74 to the second countershaft 18, to the second transfer gear 64 to the transmission output member 30 and the differential assembly 32.

To establish a seventh forward torque ratio (i.e. a 7th gear), the first clutch 28A of the dual clutch assembly 28 is engaged to couple the output member 24 of the engine 26 to the first input shaft 12 and the sixth synchronizer 76 is engaged to connect the third gear 40C of the fourth coplanar gear set 40 to the second countershaft 18. More specifically, input torque from the output member 24 of the engine 26 is transferred through the first clutch 28A of the dual clutch assembly 28 to the first input shaft 12, through the first gear 40A of the fourth coplanar gear set 40 to the third gear 40C of the fourth coplanar gear set 40, through the sixth synchronizer 76 to the second countershaft 18, to the second transfer gear 64 to the transmission output member 30 and the differential assembly 32.

To establish an eight forward torque ratio (i.e. an 8th gear), the second clutch 28B of the dual clutch assembly 28 is engaged to couple the output member 24 of the engine 26 to the second input shaft 14 and the first synchronizer 66 is engaged to connect the first gear 34A of the first coplanar gear set 34 to the second input shaft 14. More specifically, input torque from the output member 24 of the engine 26 is transferred through the second clutch 28B of the dual clutch assembly 28 to the second input shaft 14, through the first gear 34A of the first coplanar gear set 34 to the second gear 34B of the first coplanar gear set 34 and the first transfer gear 62, to the transmission output member 30 and the differential assembly 32.

Again, it should be appreciated that any one of the gear sets 34, 36, 38, 40, 44, 45 may be changed to produce a certain forward and reverse torque ratio without departing from the scope of the present invention.

Figure 2:
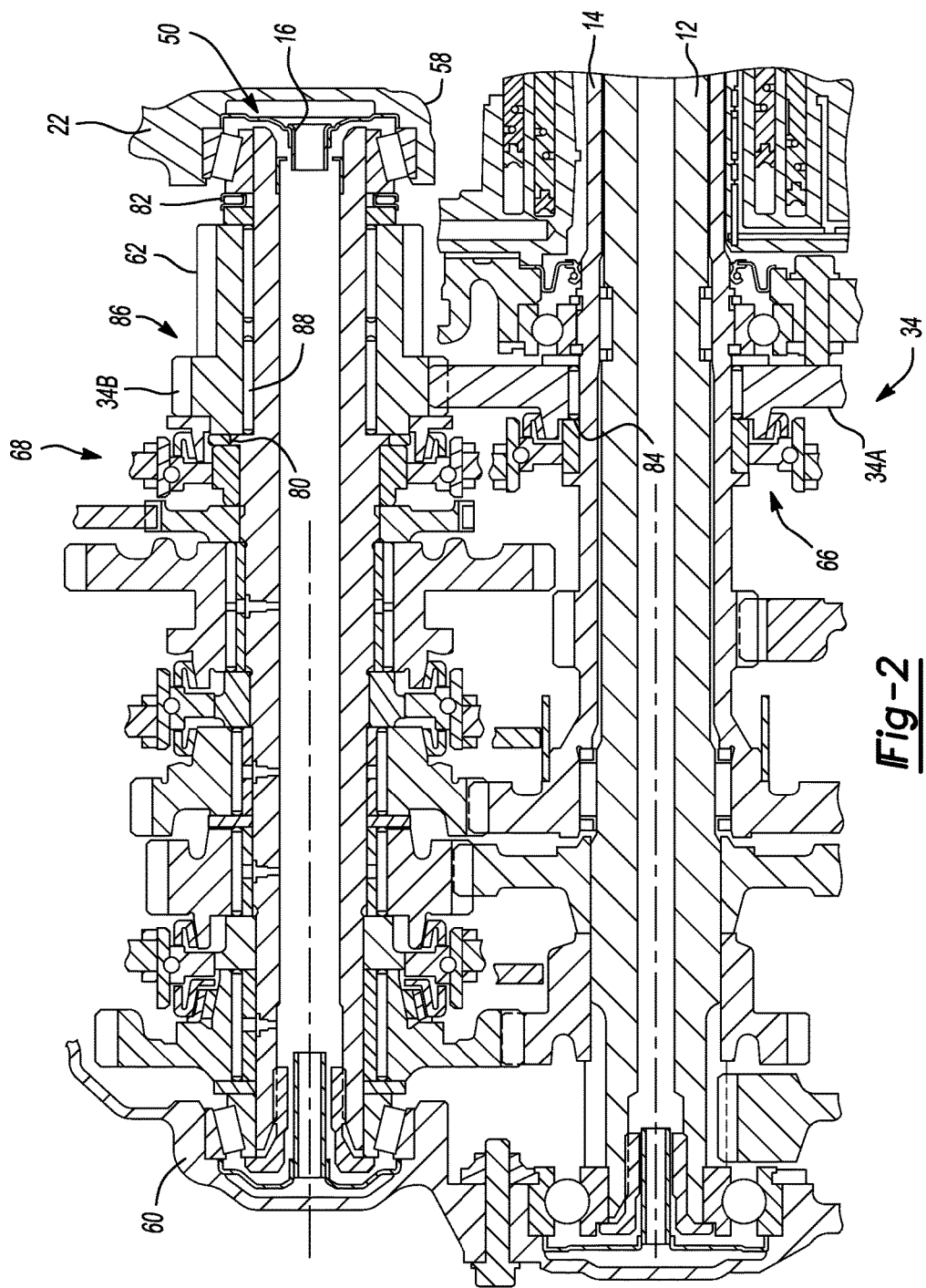
FIG. 2 is a cross-sectional view of a portion of an eight speed transmission, in accordance with the present invention.

Turning now to FIG. 2, a portion of the transmission 10 is illustrated and will now be described. The first coplanar gear set 34 further includes a first and a second thrust bearings 80, 82. More specifically, the first gear 34A of the first coplanar gear set 34 is rotatably supported on the second input shaft 14 through a first needle bearing 84. The second gear 34B and the first transfer gear 62 are combined into one overdrive transfer member 86 and rotatably supported on the first countershaft 16 through a second needle bearing 88. The first thrust bearing 80 is disposed between the overdrive transfer member 86 and the second synchronizer 68. The second thrust bearing 82 is disposed between the overdrive transfer member 86 and the bearing 50.

The present invention contemplates that a variety of torque ratios (i.e., the ratio of torque of the output member 30 to the first and second input shafts 12, 14) are achievable through the selection of tooth counts of the gears of the transmission 10. This arrangement provides the opportunity to achieve reduced transmission length in comparison with other transmissions.

While the best modes for carrying out the invention have been described in detail, those familiar with the art to which this invention relates will recognize various alternative designs and examples for practicing the invention within the scope of the appended claims.

The following is claimed:

1. A transmission comprising:
   a transmission housing;
   a plurality of coplanar gear sets each including at least a first gear in mesh with a second gear, the plurality of coplanar gear sets including at least a first coplanar gear set;
   a first input shaft rotatably supported in the transmission housing and wherein the first gear of several of the plurality of coplanar gear sets is rotatably supported by the first input shaft;
   a transmission clutch assembly including at least one clutch for selectively connecting the first input shaft to an engine output member;
   a first countershaft rotatably supported by the transmission housing and spaced apart from and parallel with the first input shaft, and wherein the second gear of several of the plurality of coplanar gear sets are selectively connectable for common rotation with the first countershaft;
   a first transfer gear and an output member, and wherein the transfer gear is intermeshed with the output member, the first transfer gear is rotatably supported by and selectively connectable with the first countershaft;
   a plurality of synchronizer assemblies each for selectively coupling at least one of the second gears of the plurality of coplanar gear sets with the first countershaft and for selectively coupling a first gear of a first of the plurality of coplanar gear sets to the first input shaft; and wherein the selective engagement of at least one of the plurality of synchronizer assemblies establishes one of a plurality of forward speed ratios and one reverse speed ratio between the first input shaft and the output member, a first gear of the first coplanar gear set is selectively connectable to the first input shaft, and a second gear of the first coplanar gear set is fixedly connected for common rotation with the first transfer gear.

2. The transmission of claim 1 wherein the first gear of the first coplanar gear set is selectively coupled for common rotation with the first input shaft and the first transfer gear is disengaged from the first countershaft to achieve an overdrive gear ratio between the first input shaft and the output member.

3. The transmission of claim 1 wherein the transmission housing includes a first end wall and a second end wall opposite the first end wall, the first end wall is disposed proximate the transmission clutch assembly, and the first coplanar gear set is disposed adjacent the first end wall.

4. The transmission of claim 1 wherein the plurality of synchronizer assemblies includes a first synchronizer assembly that selectively that connects the first gear of the first coplanar gear set to the first input shaft.

5. The transmission of claim 4 wherein the plurality of synchronizer assemblies includes a second synchronizer assembly that selectively connects the first transfer gear and the second gear of the first coplanar gear set to the first countershaft.

6. The transmission of claim 5 further including a first and second roller bearings and a first and second thrust bearings, and wherein the first countershaft is rotatably supported by the first end wall through a first roller bearing and by the second end wall through a second roller bearing, the first thrust bearing is disposed on the first countershaft between the second gear of the first coplanar gear set and the second synchronizer assembly, and the second thrust bearing is disposed on the first countershaft between the first transfer gear and the first roller bearing.

7. The transmission of claim 6 wherein the plurality of synchronizer assemblies includes a third and a fourth synchronizer assemblies and the plurality of coplanar gear sets includes a third, a fourth, and a fifth coplanar gear sets, and wherein the third synchronizer assembly selectively connects a second gear of the third coplanar gear set to the first countershaft and the fourth synchronizer assembly selectively connects a second gear of one of the fourth and fifth coplanar gear sets to the first countershaft.

8. The transmission of claim 1 further including a second input shaft and a second countershaft, and wherein the second input shaft is coaxial with and at least partially covered by the first input shaft, the second input shaft is selectively connectable to the output of the engine through a second clutch of the transmission clutch assembly and the second countershaft is disposed parallel to each of the input shafts and the first countershaft.

9. The transmission of claim 8 further including a second transfer member fixed for common rotation with the second countershaft and intermeshed with the output member.

10. The transmission of claim 9 wherein the plurality synchronizer assemblies includes a fifth synchronizer assembly and the third coplanar gear set includes a third gear, and wherein the fifth synchronizer assembly selectively connects one of the second gear of the second coplanar gear set and the third gear of the third coplanar gear set to the second countershaft.

11. The transmission of claim 10 wherein the plurality of synchronizer assemblies includes a sixth synchronizer assembly, the fourth coplanar gear set includes a third gear, the plurality of coplanar gear sets includes a sixth coplanar gear set, and the sixth synchronizer assembly selectively connects one of the second gear of the sixth coplanar gear set and the third gear of the fourth coplanar gear set to the second countershaft.

12. The transmission of claim 11 wherein the first coplanar gear set provides an eighth forward speed ratio, the second coplanar gear set provides a second forward speed ratio, the third coplanar gear set provides a sixth and a fourth forward speed ratios, the fourth coplanar gear set provides a fourth and a seventh forward speed ratios, the fifth coplanar gear set provides a third forward speed ratio, the sixth coplanar gear set provides a first forward speed ratio, and the plurality of coplanar gear sets includes a seventh coplanar gear set that provides a reverse speed ratio.

13. A transmission comprising:
a transmission housing;
a first, second, third, fourth, fifth, and sixth coplanar gear sets, wherein each of the coplanar gear sets include a first gear in mesh with a second gear and each of the third and fourth coplanar gear sets include a third gear in mesh with the first gear of the third and fourth coplanar gear sets, respectively;
a first and a second input shaft rotatably supported in the transmission housing, and wherein the first input shaft is coaxial with and at least partially covers the second input shaft, the first gear of each of the second and third coplanar gear sets is rotatably fixed for common rotation with the first input shaft, and the first gear of the each of the fourth, fifth, and sixth coplanar gear sets is rotatably fixed for common rotation with the second input shaft;
a transmission clutch assembly including a first clutch for selectively connecting the first input shaft to an engine output member and a second clutch for connecting the second input shaft to the engine output member;
an output member rotatably supported in the transmission housing;
a first countershaft rotatably supported within the transmission housing and spaced apart from and parallel with the first and second input shafts, and wherein the second gear of each of the first, third, fourth, and fifth co-planar gear sets are selectively connectable for common rotation with the first countershaft;
a second countershaft rotatably supported within the transmission housing and spaced apart from and parallel with the first and second input shafts, and wherein each of the second gear of the second and sixth coplanar gear sets and the third gear of the third and fourth coplanar gear sets are selectively connectable for common rotation with the second countershaft;
a first and a second transfer gears, and wherein the first transfer gear is rotatably supported by the first countershaft and connected for common rotation with the second gear of the first coplanar gear set, the second transfer gear is connected for common rotation with the second countershaft, and the first and second transfer gears each mesh with the output member, and
a first, second, third, fourth, fifth, and sixth synchronizer assemblies each for selectively coupling at least one of the first, second and third gears of the co-planar gear sets with one of the first countershaft the second countershaft, and the first input shaft; and wherein the selective engagement of at least one of the six synchronizer assemblies establishes one of at least eight forward speed ratios and one reverse speed ratio between the first and second input shafts and the output member.

14. The transmission of claim 13 wherein the first gear of the first coplanar gear set is selectively coupled for common rotation with the first input shaft and the first transfer gear is disengaged from the first countershaft to achieve an overdrive gear ratio between the first input shaft and the output member.

15. The transmission of claim 14 wherein the transmission housing includes a first end wall and a second end wall opposite the first end wall, the first end wall is disposed proximate the transmission clutch assembly, and the first coplanar gear set is disposed adjacent the first end wall.

16. The transmission of claim 15 wherein the first synchronizer assembly selectively connects the first gear of the first coplanar gear set with the first input shaft and the second synchronizer assembly selectively connects the second gear of the first coplanar gear set with the first countershaft.

17. The transmission of claim 16 further including a first and second roller bearings and a first and second thrust bearings, and wherein the first countershaft is rotatably supported by the first end wall through a first roller bearing and by the second end wall through a second roller bearing, the first thrust bearing is disposed on the first countershaft between the second gear of the first coplanar gear set and the second synchronizer assembly, and the second thrust bearing is disposed on the first countershaft between the first transfer gear and the first roller bearing.

18. A transmission comprising:
a transmission housing having a first end wall and a second end wall opposite the first end wall;
a first, second, third, fourth, fifth, and sixth coplanar gear sets, wherein each of the coplanar gear sets include a first gear in mesh with a second gear and each of the third and fourth coplanar gear sets include a third gear in mesh with the first gear of the third and fourth coplanar gear sets, respectively;
a first and a second input shaft rotatably supported in the transmission housing, and wherein the first input shaft is coaxial with and at least partially covers the second input shaft, the first gear of each of the second and third coplanar gear sets is rotatably fixed for common rotation with the first input shaft, and the first gear of the each of the fourth, fifth, and sixth coplanar gear sets is rotatably fixed for common rotation with the second input shaft;
a transmission clutch assembly including a first clutch for selectively connecting the first input shaft to an engine output member and a second clutch for connecting the second input shaft to the engine output member, and wherein the transmission clutch assembly is disposed outside the transmission housing adjacent the first end wall of the transmission housing;
an output member rotatably supported in the transmission housing;
a first countershaft rotatably supported within the transmission housing and spaced apart from and parallel with the first and second input shafts, and wherein the second gear of each of the first, third, fourth, and fifth co-planar gear sets are selectively connectable for common rotation with the first countershaft;
a second countershaft rotatably supported within the transmission housing and spaced apart from and parallel with the first and second input shafts, and wherein each of the second gear of the second and sixth coplanar gear sets and the third gear of the third and fourth coplanar gear sets are selectively connectable for common rotation with the second countershaft;
a first and a second transfer gears, and wherein the first transfer gear is rotatably supported by the first countershaft and connected for common rotation with the second gear of the first coplanar gear set, the second transfer gear is connected for common rotation with the second countershaft, and the first and second transfer gears each mesh with the output member, and
a first, second, third, fourth, fifth, and sixth synchronizer assemblies each for selectively coupling at least one of the first, second and third gears of the co-planar gear sets with one of the first countershaft the second countershaft, and the first input shaft, and wherein the first synchronizer assembly selectively connects the first gear of the first coplanar gear set with the first input shaft and the second synchronizer assembly selectively connects the second gear of the first coplanar gear set with the first countershaft; and
wherein the selective engagement of at least one of the six synchronizer assemblies establishes one of at least eight forward speed ratios and one reverse speed ratio between the first and second input shafts and the output member and the first coplanar gear set is disposed within the transmission housing adjacent the first end wall.

19. The transmission of claim 18 wherein the first gear of the first coplanar gear set is selectively coupled for common rotation with the first input shaft and the first transfer gear is disengaged from the first countershaft to achieve an overdrive gear ratio between the first input shaft and the output member.

20. The transmission of claim 19 further including a first and second roller bearings and a first and second thrust bearings, and wherein the first countershaft is rotatably supported by the first end wall through a first roller bearing and by the second end wall through a second roller bearing, the first thrust bearing is disposed on the first countershaft between the second gear of the first coplanar gear set and the second synchronizer assembly, and the second thrust bearing is disposed on the first countershaft between the first transfer gear and the first roller bearing.

\* \* \* \* \*